Patented Apr. 9, 1946

2,397,911

UNITED STATES PATENT OFFICE 2,397,911

PREPARATION OF N-METHYL-p-AMINOPHENOL

Frederic R. Bean, Rochester, N. Y., assignor to Eastman Kodak Company, Rochester, N. Y., a corporation of New Jersey No Drawing. Application February 27, 1943, Serial No. 477,456

4 Claims. (Cl. 260—574)

This invention relates to the preparation of N-methyl-p-aminophenol. This application is a continuation-in-part of my copending application, Serial No. 375,046, filed January 18, 1941.

N-methyl-p-aminophenol (known in the trade in the form of its sulfate, as Elon or Metol) is a well known photographic developer and antioxidant. It can be prepared by decarboxylating N-(p-hydroxyphenyl)-glycine, by condensing hydroquinone with methylamine and by condensing p-aminophenol with formaldehyde, in the presence of sodium hydroxide and aluminium. Efforts to prepare this compound by condensing p-chlorophenol with methylamine, however, have not proved successful, only a very small yield of N-methyl-p-aminophenol being obtainable even in the presence of catalysts and at high temperatures. This is especially surprising, inasmuch as p-aminophenol has been reported to be obtainable in high yields from p-chlorophenol and ammonia.

I have now found that N-methyl-p-aminophenol can be prepared in high yields by condensing p-bromophenol with methylamine, even at ordinary temperatures. Moreover, the amount of allergenic impurity in the N-methyl-p-aminophenol prepared in this manner is quite low, if the condensation is carried out at ordinary temperatures or if the condensation is carried out at rather high temperatures. I have found that whereas p-chlorophenol cannot be condensed with methylamine to give N-methyl-p-aminophenol at ordinary temperatures, p-bromophenol gives a high yield of N-methyl-p-aminophenol at ordinary temperatures. Even at elevated temperatures p-bromophenol gives yields from 50 to 65 times higher than does p-chlorophenol. The p-bromophenol condensation is all the more surprising, since under identical conditions the higher alkylamines, e. g. n-primary butylamine give no N-alkyl-p-aminophenols at all with p-bromophenol, and even ethylamine does not condense with p-bromophenol at ordinary temperatures.

It is, accordingly, an object of my invention to provide a process for preparing N-methyl-p-aminophenol. Other objects will become apparent hereinafter.

In accordance with my invention p-bromophenol is condensed with methylamine. The condensation is advantageously effected in the presence of a catalyst which accelerates the splitting out of hydrogen bromide. Copper and copper salts are especially efficacious catalysts, I have found. The condensation can be effected at ordinary temperatures or at higher temperatures. The amount of allergenic impurity which is formed in the condensation varies in accordance with the temperatures employed, I have found. Of course, when N-methyl-p-aminophenol is used for certain purposes such as for an antioxidant, the amount of allergenic impurity present is considerably less important than it is when the N-methyl-p-aminophenol is used for other purposes such as a photographic developer. At ordinary temperatures, e. g. from about 15° C. to about 30° C., the condensation goes readily, giving in 12 hours at about 20° C. to about 25° C. a yield of 73 percent of N-methyl-p-aminophenol with only 115 P. P. M. (parts per million) of allergenic impurity. At higher temperatures, e. g. 75° C., the yield is 62 percent in three hours, but the allergenic impurity rises to 1100 P. P. M. At from about 145° C. to about 225° C., on the other hand, the allergenic impurity is never higher than 23 P. P. M., while the yields are of the order of 50 to 60 percent. Contrasted with this p-chlorophenol gives at from about 145° C. to about 225° C. yields of only 1 percent, yet the allergenic impurity is fully as high as in the case of p-bromophenol where yields 50 to 60 times higher are obtained.

The following examples will serve to illustrate my new process. These examples are not intended to limit my invention.

Example 1

43 g. of p-bromophenol, 150 cc. of aqueous methylamine (25 percent) and 2 g. of copper sulfate were placed in a flask. The flask was stoppered and allowed to stand for 96 hours, at about 25° C. At the end of this time, 15 g. of sodium hydroxide were added to neutralize any hydrogen bromide or methylamine hydrobromide. The resulting solution was then distilled to remove any unreacted methylamine. The residue from the distillation was acidified with sulfuric acid and unreacted p-bromophenol was then removed by steam distillation. (An ether extraction can also be employed to remove unreacted p-bromophenol, if desired.) The resulting aqueous layer was made faintly alkaline with sodium carbonate and then extracted with three 200 cc. portions of ethyl acetate. The combined extracts were dried over sodium sulfate, the sodium sulfate filtered off and the dried extracts made faintly acid with alcoholic sulfuric acid, whereupon N-methyl-p-aminophenol sulfate separated out. The aminophenol sulfate was filtered off and dried in the air. Yield 73 percent. Allergenic impurity, 115 P. P. M. Melting point 259° C., with decomposition. The allergenic impurity in this product can be easily eliminated by one or more recrystallizations of the product from water, decolorizing with activated charcoal.

*Example 2*

47 g. of p-bromophenol, 180 cc. of aqueous methylamine (33 percent) and 150 cc. of water were placed in a one-liter copper-lined shaking autoclave. The autoclave was heated, with shaking, for three hours at 75° C. At the end of this time, the contents of the autoclave were removed and made alkaline with sodium hydroxide. The resulting alkaline mixture was distilled for about one hour until unreacted methylamine was removed. The residue from the distillation was acidified with sulfuric acid. A trace of unreacted p-bromophenol was removed with an ether extraction. The aqueous residue was made slightly alkaline with sodium carbonate and then extracted with three portions of ethyl acetate. The ethyl acetate extract was dried over calcium chloride, the calcium chloride filtered off and the dried extract made faintly acid with alcoholic sulfuric acid, whereupon N-methyl-p-aminophenol sulfate separated out. The aminophenol sulfate was filtered off and dried in the air. Yield 62 percent. Allergenic impurity 1100 P. P. M.

*Example 3* p-Bromophenol was treated exactly as in Example 2, except that the autoclave was heated at 145° to 155° C. for 12 hours. The yield of N-methyl-p-aminophenol sulfate in this case was 50 percent and the allergenic impurity was about 23 P. P. M.

*Example 4* p-Bromophenol was treated exactly as in Example 2, except that the autoclave was heated at from 180° to 200° C. for 5 hours. The yield in this case was 60 percent and the allergenic impurity, if any, was not more than a few P. P. M.

The allergenic impurity referred to herein may possibly more properly be called a skin irritant. However, it is customary in the trade to refer to the impurity as an allergenic ingredient.

What I claim as my invention and desire to be secured by Letters Patent of the United States is:

1. A process for preparing N-methyl-p-aminophenol comprising condensing p-bromophenol with methylamine, in the presence of a copper catalyst.

2. A process for preparing N-methyl-p-aminophenol comprising condensing p-bromophenol with methylamine, in the presence of a copper sulfate catalyst.

3. A process for preparing N-methyl-p-aminophenol comprising condensing p-bromophenol with methylamine, in the presence of a copper sulfate catalyst, at a temperature of from about 20° C. to about 25° C.

4. A process for preparing N-methyl-p-aminophenol comprising condensing p-bromophenol with methylamine, in the presence of a copper sulfate catalyst, at a temperature of from about 145° C. to about 225° C.

FREDERIC R. BEAN.